United States Patent
Jiang et al.

(10) Patent No.: US 12,236,361 B2
(45) Date of Patent: Feb. 25, 2025

(54) QUESTION ANALYSIS METHOD, DEVICE, KNOWLEDGE BASE QUESTION ANSWERING SYSTEM AND ELECTRONIC EQUIPMENT

(71) Applicant: Beijing Baidu Netcom Science and Technology Co., Ltd., Beijing (CN)

(72) Inventors: Wenbin Jiang, Beijing (CN); Huanyu Zhou, Beijing (CN); Meng Tian, Beijing (CN); Ying Li, Beijing (CN); Xinwei Feng, Beijing (CN); Xunchao Song, Beijing (CN); Pengcheng Yuan, Beijing (CN); Yajuan Lyu, Beijing (CN); Yong Zhu, Beijing (CN)

(73) Assignee: Beijing Baidu Netcom Science and Technology Co., Ltd, Beijing (CN)

( * ) Notice: Subject to any disclaimer, the term of this patent is extended or adjusted under 35 U.S.C. 154(b) by 1185 days.

(21) Appl. No.: 17/037,612

(22) Filed: Sep. 29, 2020

(65) Prior Publication Data
US 2021/0319335 A1    Oct. 14, 2021

(30) Foreign Application Priority Data
Apr. 8, 2020   (CN) .......................... 202010267909.9

(51) Int. Cl.
*G06F 40/30*     (2020.01)
*G06N 5/02*      (2023.01)
*G06N 5/04*      (2023.01)

(52) U.S. Cl.
CPC .............. *G06N 5/04* (2013.01); *G06F 40/30* (2020.01); *G06N 5/02* (2013.01)

(58) Field of Classification Search
CPC .................................................... G06F 40/30
See application file for complete search history.

(56) References Cited

U.S. PATENT DOCUMENTS

2014/0180999 A1    6/2014  Chun et al.
2016/0328467 A1*  11/2016  Zou ....................... G06F 40/242
(Continued)

FOREIGN PATENT DOCUMENTS

CN        101201818 A       6/2008
CN        101655783 A       2/2010
(Continued)

OTHER PUBLICATIONS

Zhao, et al. "Interactive Attention Networks for Semantic Text Matching," 2020 IEEE ICDM. (Year: 2020).*
(Continued)

*Primary Examiner* — Feng-Tzer Tzeng
(74) *Attorney, Agent, or Firm* — Hunton Andrews Kurth LLP

(57) ABSTRACT

The present disclosure discloses a question analysis method, a device, a knowledge base question answering system and an electronic equipment. The method includes: analyzing a question to obtain N linearized sequences, N being an integer greater than 1; converting the N linearized sequences into N network topology maps; separately calculating a semantic matching degree of each of the N network topology maps to the question; and selecting a network topology map having a highest semantic matching degree to the question as a query graph of the question from the N network topology maps. According to the technology of the present disclosure, the query graph of the question can be obtained more accurately, and the accuracy of the question to the query graph is improved, thereby improving the accuracy of question analysis.

9 Claims, 6 Drawing Sheets

(56) References Cited

U.S. PATENT DOCUMENTS

| | | | |
|---|---|---|---|
| 2018/0314729 A9* | 11/2018 | Reschke | G06F 16/2428 |
| 2018/0373702 A1 | 12/2018 | Wang et al. | |
| 2019/0279104 A1 | 9/2019 | Brake et al. | |

FOREIGN PATENT DOCUMENTS

| | | | | |
|---|---|---|---|---|
| CN | 103885969 A | | 6/2014 | |
| CN | 104657439 A | | 5/2015 | |
| CN | 106815071 A | | 6/2017 | |
| CN | 107038262 A | | 8/2017 | |
| CN | 108491381 A | | 9/2018 | |
| CN | 108804521 A | | 11/2018 | |
| CN | 108804633 A | | 11/2018 | |
| CN | 109033374 A | | 12/2018 | |
| CN | 110188176 A | | 8/2019 | |
| CN | 110457431 A | | 11/2019 | |
| CN | 110555153 A | | 12/2019 | |
| CN | 110704600 A | | 1/2020 | |
| CN | 108399163 B | * | 1/2021 | ........... G06F 16/355 |
| CN | 107885760 B | | 6/2021 | |
| EP | 0525470 A2 | | 2/1993 | |
| JP | 2003533827 A | | 11/2003 | |
| JP | 2013080476 A | | 5/2013 | |

OTHER PUBLICATIONS

Berant, et al. "Semantic Parsing on Freebase from Question-Answer Pairs," Proceedings of the 2013 Conference on Empirical Methods in Natural Language Processing. (Year: 2013).*

Japanese Office Action, issued from the Japan Patent Office to JP Application No. 2020-191447 on Dec. 16, 2021, 5 pages.

Journal of Beijing University of Technology, Expert System for the Syntax Analysis Of Chinese Based on Man's Cognition Behavior, vol. 29 No. 1, Mar. 2023.

China National Intellectual Property Administration, First office action, CN application No. 202010267909.9 on Feb. 9, 2023, 8 pages.

Zhao, S., et al., "Interactive Attention for Semantic Text Matching," Cornell University Library, Nov. 11, 2019, 9 pages.

Abolghasemi, A., et al., "Neural Relation Prediction for Simple Question Answering over Knowledge Graph, Cornell University Library," Feb. 18, 2020, 17 pages.

Extended European Search Report issued from the European Patent Office to EP Application No. 20201853.7 on Mar. 31, 2021, 10 pages.

* cited by examiner

QUESTION ANALYSIS METHOD, DEVICE, KNOWLEDGE BASE QUESTION ANSWERING SYSTEM AND ELECTRONIC EQUIPMENT

CROSS-REFERENCE TO RELATED APPLICATION

This application claims a priority to Chinese Patent Application No. 202010267909.9 filed on Apr. 8, 2020, the disclosures of which are incorporated in their entirety by reference herein.

TECHNICAL FIELD

The present disclosure relates to the field of data processing technology, in particular to the technical field of knowledge base question answering, and specifically related to a question analysis method, a device, a knowledge base question answering system and an electronic equipment.

BACKGROUND

Knowledge base question answering (KBQA) is to directly answer users' questions in natural language by using a knowledge graph (KG) as the knowledge base of question answering.

In the knowledge base question answering technology, semantic analysis technology is usually used. The query graph is increasingly used in the knowledge base question answering technology due to its clear and concise semantic representation characteristics. However, the current manner to acquire the question query graph is generally by simply fusing the word sequence of the question, to obtain the query graph of the question. For more complex questions, there may be more ways of fusing the word sequences, which may result in poor accuracy of the query graph generated by fusion.

SUMMARY

The present disclosure provides a question analysis method, a device, a knowledge base question answering system and an electronic equipment.

According to the first aspect, the present disclosure provides a question analysis method, including: analyzing a question to obtain N linearized sequences, N being an integer greater than 1; converting the N linearized sequences into N network topology maps; separately calculating the semantic matching degree of each of the N network topology maps to the question; and selecting a network topology map having the highest semantic matching degree to the question as a query graph of the question from the N network topology maps.

According to the second aspect, the present disclosure provides a question analysis device, including: an analysis module, configured to analyze a question to obtain N linearized sequences, N being an integer greater than 1; a conversion module, configured to convert the N linearized sequences into N network topology maps; a calculation module, configured to separately calculate the semantic matching degree of each of the N network topology maps to the question; and a selection module, configured to select a network topology map having the highest semantic matching degree to the question as a query graph of the question from the N network topology maps.

According to the third aspect, the present disclosure provides a question analysis device, including: a translation model, configured to acquire a question and analyze the question to obtain N linearized sequences, N being an integer greater than 1; a sequence-to-graph conversion model, in which an input end of the sequence-to-graph conversion model is connected to an output end of the translation model, and the sequence-to-graph conversion model acquires the N linearized sequences and convert the N linearized sequences into N network topology maps respectively; an encoding network, in which an input end of the encoding network is connected to an output end of the sequence-to-graph conversion model, and the encoding network acquires the question and the N network topology maps; the encoding network performs a first coding on the question, to obtain the semantic representation vector of the question; and the encoding network also performs a second encoding on each of the N network topology maps, to obtain the semantic representation vector of each of the N network topology maps; and a matching network, in which an input end of the matching network is connected to an output end of the encoding network, and the matching network acquires the semantic representation vector of the question and the semantic representation vector of each of the N network topology maps, and calculates a semantic matching degree of each of the N network topology maps to the question according to the semantic representation vector of the question and the semantic representation vector of each of the N network topology maps.

According to the fourth aspect, the present disclosure provides a knowledge base question answering system, in which the knowledge base question answering system includes any question analysis device in the second aspect; or the knowledge base question answering system includes any question analysis device in the third aspect.

According to the fifth aspect, the present disclosure provides an electronic device, including: at least one processor; and a memory communicatively connected with the at least one processor, in which the memory stores an instruction executable by the at least one processor, and the instruction are executed by the at least one processor so that the at least one processor is capable of executing any one of the methods in the first aspect.

According to a sixth aspect, the present disclosure provides a non-transitory computer-readable storage medium storing computer instruction, in which the computer instruction is configured to allow the computer execute the method of any one in the first aspect.

According to the technology of the present disclosure, the query graph of the question can be obtained more accurately, and the accuracy of the question to the query graph is improved, thereby improving the accuracy of question analysis. The present disclosure solves the problem that the query graph generated based on the fusion method of word sequences in the related art has relatively poor accuracy.

It should be understood that the content described in this section is neither intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure. Among them.

DETAILED DESCRIPTION

The exemplary embodiments of the present disclosure will be described below in conjunction with the drawings, which include various details of the embodiments of the present disclosure to be helpful for understanding, and should be considered as merely exemplary. Therefore, those skilled in the art should recognize that various changes and modifications may be made to the embodiments described herein without departing from the scope and spirit of the present disclosure. Similarly, for clarity and conciseness, the descriptions of well-known functions and structures are omitted in the following description.

First Embodiment

Figure 1:
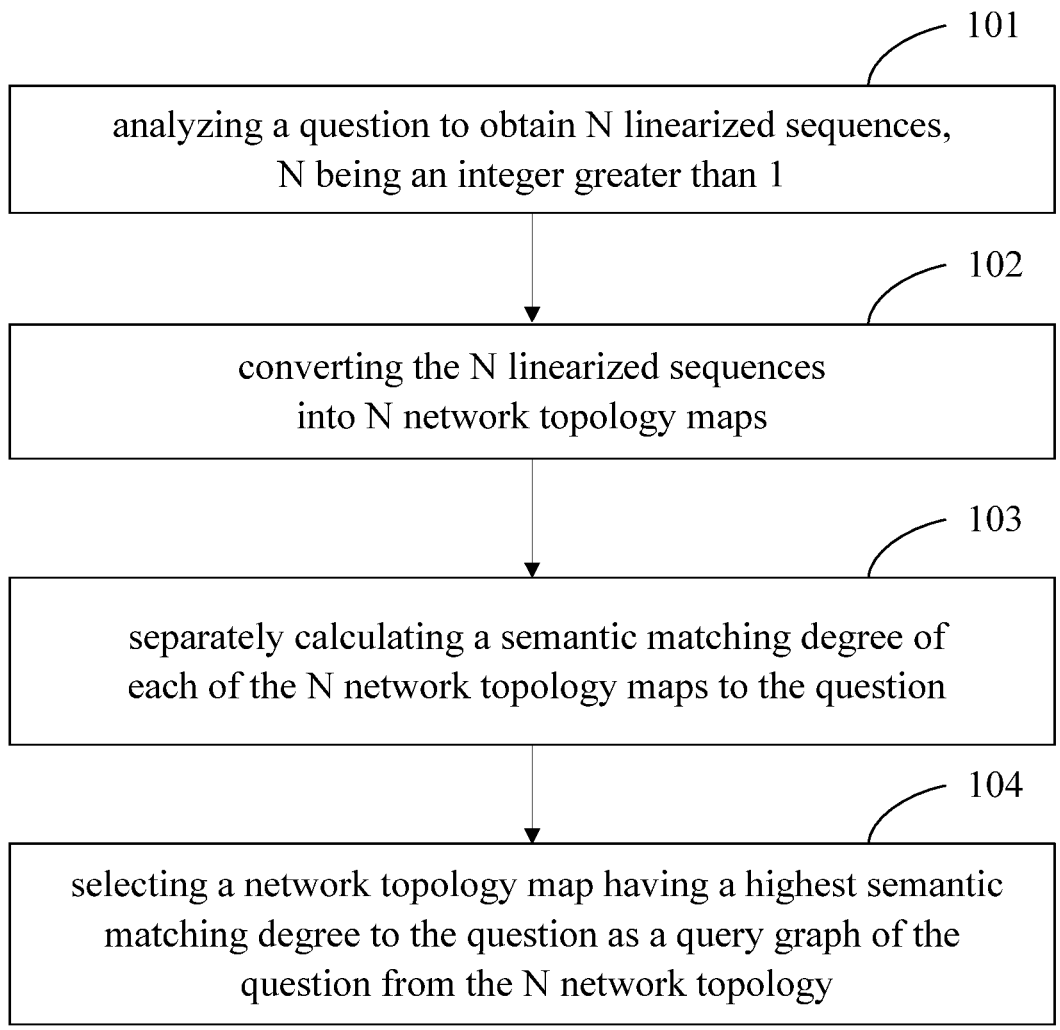
FIG. 1 is a schematic flowchart showing a question analysis method according to the first embodiment of the present disclosure.

As shown in FIG. 1, the present disclosure provides a question analysis method, including the following steps.

Step 101: analyzing a question to obtain N linearized sequences, N being an integer greater than 1.

Among them, the term "question" can be understood as a question posed by the user in natural language. The question can be input to the question analysis device by the user through a user interface. As for the question analysis device, the question can also be called "information".

The term "linearized sequence" can be understood as a sequence formed by the related words and auxiliary symbols of the question in a linearized manner, and the linearized sequence can also be called a symbol sequence.

The meaning of a linearized sequence is to express the structure of a graph by means of a symbol sequence, or to express a two-dimensional structure by means of a linearized or one-dimensional expression. For example, the linearized sequence "(A(B,C))" can represent as "directed graph structure having A as the parent and B and C as the children". A, B, and C represent nodes in the graph, and parentheses are auxiliary symbols. Two directed edges from A point to B and C respectively. The direction of the edge represents the inheritance direction of blood relationship. A can be understood as the answer node of a linearized sequence, and B and C can be understood as the entity node of the linearized sequence. The entity nodes of the linearized sequence can be understood as the related words of the question.

In the questions posed by the user in natural language, the smallest semantic unit is a word (or a character). In this step, the process of the analyzing the question to obtain a linearized sequence can be understood as the process from the question to the word sequence (or character sequence) of the question, and then from the word sequence of the question to the linearized sequence.

In the process of analyzing the question to obtain the linearized sequence, the goal of the conversion from the question to N linearized sequences can be achieved by learning the rule of the conversion from word sequence to linear sequence of the question. For example, the word sequence of the question can be expressed as a linearized form of various symbol sequences by adding specific auxiliary symbols through appropriate rules.

In the present disclosure, both the word sequence and linearized sequence of the question are sequences, that is, the source end is the word sequence that constitutes the question, and the target end is the linearized word and auxiliary symbol sequence. Therefore, the conversion from the question to the linearized sequence can be realized by means of machine translation using the sequence-to-sequence neural network. In other words, the translation model can be configured in the sequence-to-sequence neural network, and the translation model can realize the conversion from the question to the linearized sequence. The sequence-to-sequence neural network can be obtained by training a training corpus composed of a large number of question-linearized sequence pairs.

The more complex the question, the greater the number of related words. A single question can be understood by the machine as a variety of possible word sequences. Therefore, the sequence-to-sequence neural network can output a plurality of possible linearized sequences, that is, the sequence-to-sequence neural network can analyze the question to obtain N linearized sequences. By analyzing the question to obtain N linearized sequences, the question can be analyzed more comprehensively. In addition, the process of acquiring N linearized sequences from analyzing the questions is relatively simple and rapid, and the processing time is short. Therefore, by analyzing the question, all possible linearized sequences of the question can be obtained quickly and comprehensively.

Step 102: converting the N linearized sequences into N network topology maps.

After the N linearized sequences are obtained by analyzing the question, this step can realize the converting of the N linearized sequences into N network topology maps.

The network topology map can also be called a directed acyclic graph. As the above mentioned, the meaning of linearized sequence is to express a graph-like structure through symbolic sequence, or to express a two-dimensional structure through a linearized or one-dimensional expression. In view of this, the linearized sequence is actually an expression form of the network topology map. Therefore, there is a one-to-one correspondence between N linearized sequences and N network topology maps, that is, each linearized sequence can be converted into a unique network topology map.

Figure 2:
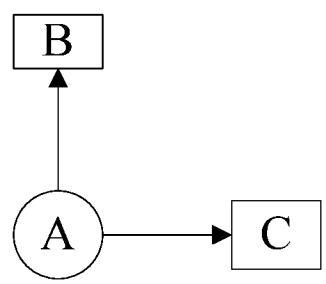
FIGS. 2 to 4 are schematic views showing the network topology map according to the first embodiment of the present disclosure.

A linearized sequence can be converted into a network topology map through a simple rule, or in other words, a network topology map can be converted into a linearized sequence through a simple rule. The conversion process therebetween is shown roughly as follows. First, adding a reverse edge to each directed edge in the linearized sequence, in which the direction of the edge is opposite, and the label of the edge is marked with a specific mark for distinguishing purpose, such as "reversed". Then, using the answer node of the sequence as the root node, to generate a directed acyclic connected graph (or "spanning tree") having the answer node as the root and the entity nodes in the linearized sequence as the leaves, and covering all nodes of the linearized sequence. The operation of adding reverse edges in the first step provides more traversal paths for the spanning tree algorithm in the second step. The spanning tree algorithm in the second step can be adapted from the spanning tree algorithm in the classic data structure, in which the adaptation operation includes: processing the object to extend it from an undirected graph to a directed graph, and fixing the root node and the leaf node in the generating process. As an example, the linearized sequence (A(B, C)) can be converted into the network topology as shown in FIG. 2.

In the present disclosure, the conversion from linearized sequence to network topology map can be realized using a sequence-to-graph conversion model by configuring the sequence-to-graph conversion model.

The topology information in the network topology map can clearly, concisely and intuitively reflect the semantic representation of the question, and the machine can better understand the network topology map, in which the above query graph belongs to the network topology map.

Until step 101 to step 102, N network topology maps corresponding to the question are obtained, but these N network topology maps are not the final query graphs, and these N network topology maps can be understood as candidate query graphs of the question.

In the present disclosure, in the case that N topological structure diagrams corresponding to the question are obtained, based on the semantic matching degree of the network topology map to the question, the topological structure diagram having the highest semantic matching degree can be determined from the N topological structure diagrams and used as the query graph of the question, in which this process is implemented through step 103 to step 104.

It should be noted that the process of converting N linearized sequences into N network topology maps is relatively simple and rapid, and the processing time is short. Therefore, all possible candidate query graphs of the question can be obtained quickly and comprehensively.

Step 103: separately calculating the semantic matching degree of each of the N network topology maps to the question.

The semantic matching degree can better reflect the matching degree of the question to the network topology map in terms of semantic understanding, and can better represent the correlation degree between the question and the network topology map.

In the present disclosure, the calculation of the semantic matching degree of the network topology map to the question can be realized using a matching network by configuring the matching network.

Step 104: selecting a network topology map having the highest semantic matching degree to the question as a query graph of the question from the N network topology.

By selecting the network topology map having the highest semantic matching degree to the question from the N network topology maps, the query graph of the determined question has higher accuracy.

Figure 3:
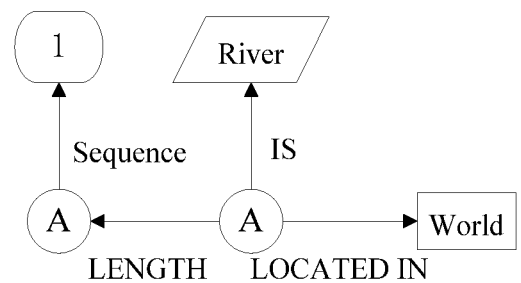
Figure 4:
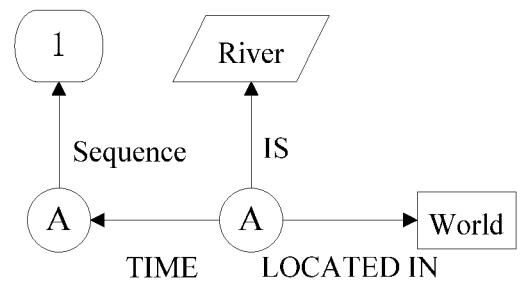

As an example, the question imputed by the user is assumed to be "what is the longest river in the world?", the linearized sequence corresponding to the question can be "(A (LENGTH (sequence 1)) (IS river) (LOCATED IN world))", in which the linearized sequence can be converted into the network topology map as shown in FIG. 3; or, the linearized sequence corresponding to the question can also be "(A (TIME (sequence 1)) (IS river) (LOCATED IN world))", in which the linearized sequence can be converted into the network topology map as shown in FIG. 4; etc. After the network topology maps as shown in FIGS. 3 to 4 are acquired, the semantic matching degree of the network topology maps to the question as shown in FIGS. 3 and 4 can be calculated separately. If the semantic matching degree of the network topology maps to the question as shown in FIG. 3 is higher than the semantic matching degree of the network topology maps to the question as shown in FIG. 4, the network topology map as shown in FIG. 3 is used as the query graph of the question.

The above whole process from question to query graph includes two processes from rough to refined: the first process realizes the conversion from question to candidate query graph, and the second process realizes the determination of query graph from candidate query graph. The former quickly and efficiently realizes the conversion of the question word sequence to the linearized sequence in a sequence-to-sequence manner, and quickly and efficiently realizes the conversion of the linearized sequence to the network topology map, thereby quickly and efficiently generating a plurality of candidate query graphs for the question. The latter realizes the accurate matching between the question and the query graph, and improves the accuracy of the question to the query graph, thereby improving the accuracy of question analysis. Since the above technical means are adopted, the problem that the query graph generated based on the fusion method of word sequences in the related art has relatively poor accuracy is well solved.

Figure 5:
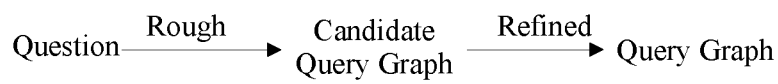
FIG. 5 is a schematic view showing the overall flow from the question to query graph according to the first embodiment of the present disclosure.
Figure 6:
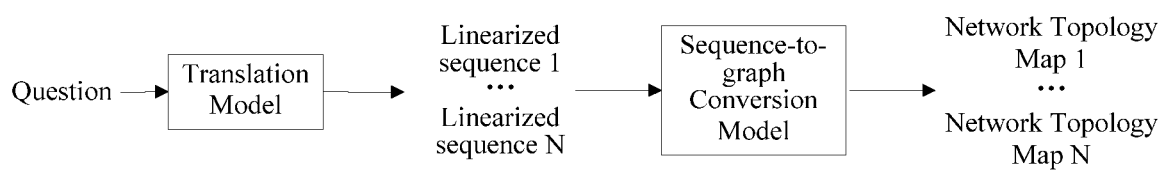
FIG. 6 is a schematic view from the question to candidate query graph according to the first embodiment of the present disclosure.
Figure 7:
FIG. 7 is a schematic view showing the determining the query graph from the candidate query graph according to the first embodiment of the present disclosure.

In order to better understand the above whole process from question to query graph, in the present disclosure, FIGS. 5 to 7 separately show the overall process from question to query graph (see FIG. 5), the conversion process from question to candidate query graph (see FIG. 6), and the process of determining the query graph from the candidate query graph (see FIG. 7). Among them, in FIG. 6, the network topology maps 1, . . . , and the network topology map n are all candidate query graphs.

The related implementations for calculating the semantic matching degree of the network topology map to the question will be described below.

Optionally, the separately calculating the semantic matching degree of each of the N network topology maps to the question includes: acquiring a semantic representation vector of the question; acquiring a semantic representation vector of each of the N network topology maps; and separately calculating a semantic matching degree of each of the N network topology maps to the question according to the semantic representation vector of the question and the semantic representation vector of each of the N network topology maps.

In the present disclosure, the semantic representations of the question and of the network topology map can be calculated separately, to acquire the semantic representation vector of the question and the semantic representation vector of the network topology map; and then the matching degree between the two semantic representation vectors is calculated. It should be noted that the order of executing the step of acquiring the semantic representation vector of the question and the step of acquiring the semantic representation vector of each of the N network topology maps is not limited herein.

Figure 8:
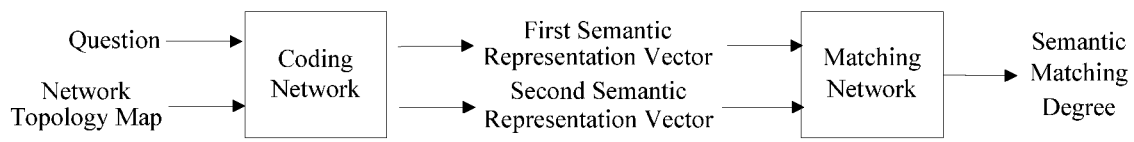
FIG. 8 is a schematic view showing the determining the query graph from the candidate query graph according to the first embodiment of the present disclosure.

As shown in FIG. 8, in the present disclosure, the calculation of the semantic representation of the question and the network topology map can be realized using a coding network by configuring the coding network. In FIG. 8, the first semantic representation vector is the semantic representation vector of the question, and the second semantic representation vector is the semantic representation vector of the network topology map.

In the present disclosure, the calculation of the semantic representation of the question and the network topology map can be realized in a unified manner using a coding network by configuring a unified coding network, so as to obtain the semantic representation vectors of the question and of the network topology map; or the calculation of the semantic representation of the question and the network topology map can be realized separately using different coding networks by configuring the different coding networks, so as to obtain the semantic representation vectors of the question and of the network topology map.

In this embodiment, the semantic representation vector can more accurately reflect the semantic representation of the question or of the network topology map. Therefore, it is more conductive to more accurately characterizing the correlation degree between the question and the network topology map by acquiring the semantic representation vectors of the question and of the network topology map and by calculating the semantic matching degrees thereof based on the semantic representation vector thereof.

Further, the present disclosure can calculate the matching degree between two semantic representation vectors in a cosine manner, or can use a neural network to calculate the matching degree between two semantic representation vectors, which are not limited in the present disclosure.

As for the semantic representation of the network topology map, the present disclosure may use a graph neural network (or a graph neural network encoder) to calculate the semantic representation of the network topology map, that is, the semantic representation vector of the network topology map is generate by the graph neural network.

As for the semantic representation of the question, the present disclosure can process it in two manners: the first one is to generate the semantic representation vector for the question through a sequence neural network (or serialization encoder), that is, by using a sequential neural network, such as RNN (Recurrent Neural Network), BERT (Bidirectional Encoder Representations from Transformers), ERNIE (Enhanced Representation from knowledge Integration) and other semantic representations of computing questions; and the second one is to generate the semantic representation vector for the question through a graph neural network, that is, by also regarding the word sequence of the question as a graph structure and calculating its semantic representation with the graph neural network. The two methods are described separately below.

Optionally, the acquiring the semantic representation vector of the question includes: acquiring a semantic representation vector corresponding to the word sequence of the question; or converting a word sequence of the question into a graph structure, and acquiring a semantic representation vector of the graph structure.

Figure 9:
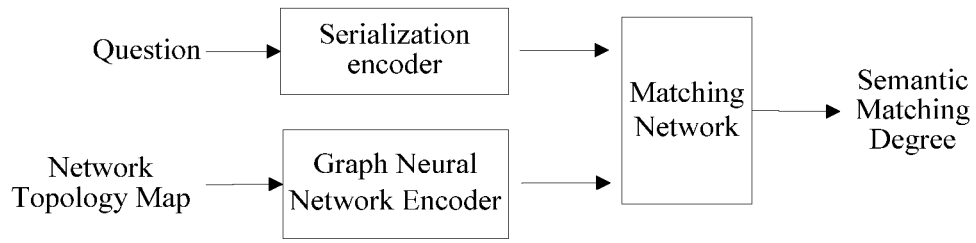
FIGS. 9 to 10 are schematic views showing two optional embodiments of FIG. 8.

As one of the embodiments, as shown in FIG. 9, the word sequence of the question can be expressed as a semantic representation vector through a sequence neural network (or a serialization encoder).

In this embodiment, the process of acquiring the semantic representation vector corresponding to the word sequence of the question is relatively simple, direct and fast. Therefore, the acquiring the semantic representation vector corresponding to the word sequence of the question has the characteristic of higher efficiency.

Figure 10:
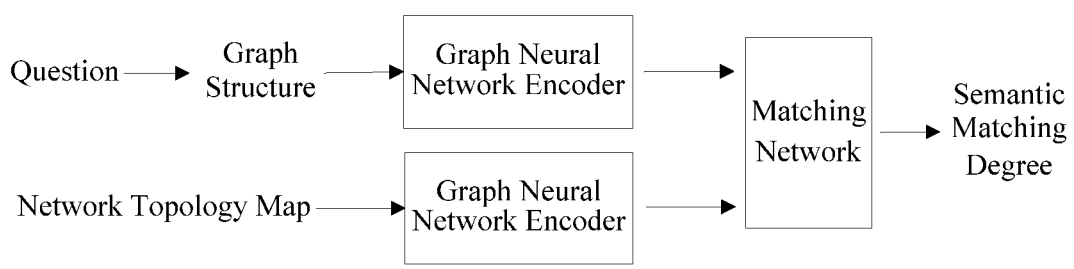

As another embodiment, as shown in FIG. 10, the word sequence of the question can be first expressed as a graph structure, and then the semantic representation vector of the graph structure can be obtained through a graph neural network (or a graph neural network encoder).

In this embodiment, the word sequence of the question can be represented as a graph structure in the following manner: assuming that there is an edge between any two words in the word sequence, and converting the word sequence of the question into a fully connected graph, to describe the semantic connection between the words in the question. That is to say, the graph structure is a fully connected graph, where any word in the word sequence of the question is regarded as a node, and any two nodes are connected.

In this embodiment, the word sequence of the question can also be expressed as a graph structure with the help of the result of the natural language processing dependency analysis. In this way, the tree structure obtained by the dependency analysis is used as the graph structure representing the word sequence of the question.

It should be noted that in the embodiments of acquiring the semantic representation vector of the question through the graph neural network and acquiring the semantic representation vector of the network topology map through the graph neural network, a unified graph neural network can be configured. The calculations of the semantic representations of the question and the topology structure graph are uniformly realized by the graph neural network, so as to obtain the semantic representation vectors of the question and of the network topology map. Or different graph neural networks can be configured, and the calculations of the semantic representations of the question and the topology structure graph are separately realized by different graph neural networks, so as to obtain the semantic representation vectors of the question and of the network topology map.

Regardless of the above embodiments, the semantic representation vector corresponding to the question can be effectively obtained. In practical applications, any suitable manner can be selected for implementation according to actual needs.

In the present disclosure, in the process of acquiring the semantic representation vectors of the question and of the network topology map, an attention mechanism can be introduced to improve the acquiring process. The following is a description of the introducing the attention mechanism.

Optionally, the method further includes: in the acquiring the semantic representation vector of the question and the semantic representation vector of the network topology map, exchanging information between the question and the network topology map based on an attention mechanism, to generate the semantic representation vector of the question and the semantic representation vector of the network topology map.

In this embodiment, in the process of learning the semantic representations of the question and of the network topology map, more sufficient information exchange between the question and the network topology map can be realized by introducing an attention mechanism.

Specifically, as for the above embodiments of acquiring the semantic representation vector corresponding to the word sequence of the question, an attention can be drawn from each word in the word sequence of the question to each node in the network topology map, and can also be drawn from each node in the network topology map to each word in the word sequence of the question.

As for the above embodiments of converting the word sequence of the question into the graph structure and acquiring the semantic representation vector of the graph structure, an attention can be drawn from each node in the graph structure of the question to each node in the network topology map, and can also be drawn from each node in the network topology map to each word in the graph structure of the question.

Figure 11:
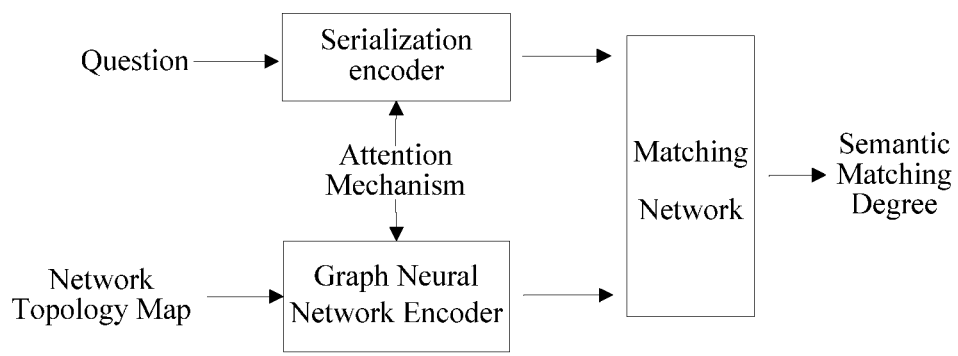
FIG. 11 is a schematic view showing the introducing the attention mechanism of FIG. 9.
Figure 12:
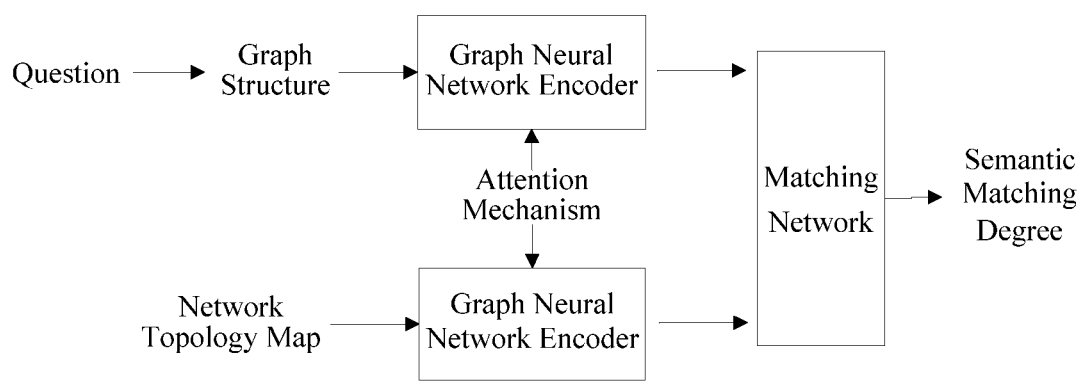
FIG. 12 is a schematic view showing the introducing the attention mechanism of FIG. 10.

FIGS. 11 to 12 are schematic views showing the introducing the attention mechanism in FIGS. 9 to 10, respectively.

In this way, by introducing the attention mechanism, in the process of learning the semantic representation of the question, the semantic representation information from the network topology map can be used; and correspondingly, in the process of learning the semantic representation of the network topology map, the semantic representation information from the question can also be used, so as to help improve the learning effect of their semantic representation.

Therefore, by introducing the attention mechanism, more extensive and sufficient information exchange can improve the semantic matching effect between the question and the network topology map, thereby further improving the accuracy of the question to the query graph, and further improving the accuracy of the question analysis.

It should be noted that the various optional embodiments in the question analysis method according to the present disclosure can be implemented in combination with each other or can be implemented separately, which is not limited in the present disclosure.

The foregoing embodiments of the present disclosure have at least the following advantages or beneficial effects.

In the present disclosure, the question analysis process includes two processes from rough to refined: the first process realizes the conversion from the question to the candidate query graph, and the second process realizes the determination of the query graph from the candidate query graph. The former quickly and efficiently realizes the conversion of the question word sequence to the linearized sequence in a sequence-to-sequence manner, and quickly and efficiently realizes the conversion of the linearized sequence to the network topology map, thereby quickly and efficiently generating a plurality of candidate query graphs for the question. The latter realizes the accurate matching between the question and the query graph, and improves the accuracy of the question to the query graph, thereby improving the accuracy of question analysis. Since the above technical means are adopted, the question that the query graph generated based on the fusion method of word sequences in the related art has relatively poor accuracy is well solved.

Second Embodiment

Figure 13:
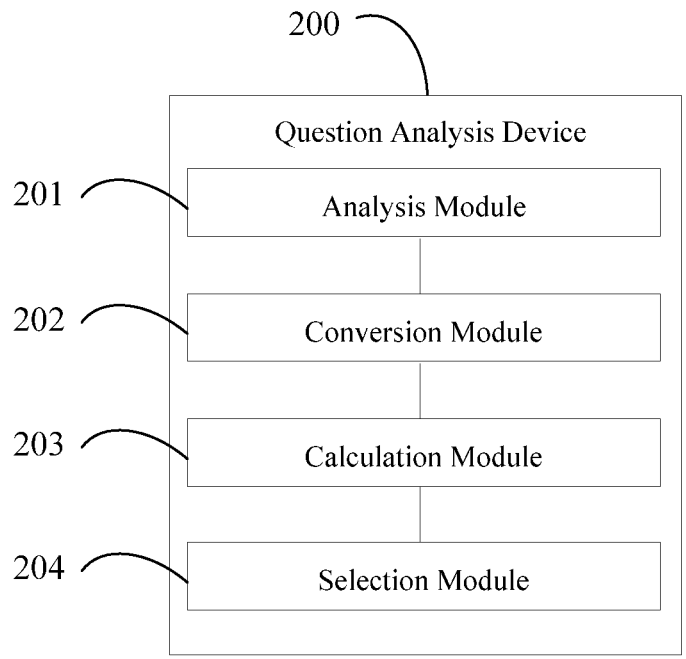
FIG. 13 is a schematic view showing the structure of the question analysis device according to a second embodiment of the present disclosure.

As shown in FIG. 13, the present disclosure provides a question analysis device 200, including: an analysis module 201, configured to analyze a question to obtain N linearized sequences, N being an integer greater than 1; a conversion module 202, configured to convert the N linearized sequences into N network topology maps; a calculation module 203, configured to separately calculate the semantic matching degree of each of the N network topology maps to the question; and a selection module 204, configured to select a network topology map having the highest semantic matching degree to the question as a query graph of the question from the N network topology maps.

Optionally, the calculation module 203 includes: a first acquisition sub-module, configured to acquire the semantic representation vector of the question; a second acquisition sub-module, configured to acquire the semantic representation vector of each of the N network topology maps; and a calculation sub-module, configured to separately calculate a semantic matching degree of each of the N network topology maps to the question according to the semantic representation vector of the question and the semantic representation vector of each of the N network topology maps.

Optionally, the first acquisition sub-module is specifically configured to acquire a semantic representation vector corresponding to the word sequence of the question; or convert a word sequence of the question into a graph structure, and acquire a semantic representation vector of the graph structure.

Optionally, the graph structure is a fully connected graph, where any word in the word sequence of the question is regarded as a node, and any two nodes are connected.

Optionally, the question analysis device 200 further includes: an interaction module, configured to, in the acquiring the semantic representation vector of the question and the semantic representation vector of the network topology map, exchange information between the question and the network topology map based on an attention mechanism, to generate the semantic representation vector of the question and the semantic representation vector of the network topology map.

The question analysis device 200 according to the present disclosure can implement each process implemented by the question analysis device in the question analysis method of the above embodiment, and can achieve the same beneficial effects. To avoid repetition, the details are not repeated herein.

Third Embodiment

Figure 14:
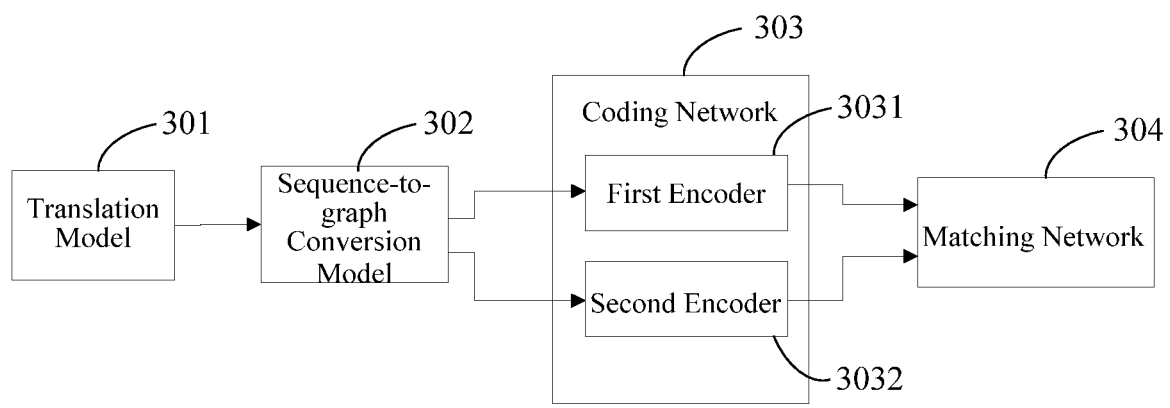
FIG. 14 is a schematic view showing the structure of the question analysis device according to a third embodiment of the present disclosure.

As shown in FIG. 14, the present disclosure provides a question analysis device 300, including: a translation model 301, configured to acquire a question and analyze the question to obtain N linearized sequences, N being an integer greater than 1; a sequence-to-graph conversion model 302, in which an input end of the sequence-to-graph conversion model 302 is connected to an output end of the translation model 301, and the sequence-to-graph conversion model 302 acquires the N linearized sequences and convert the N linearized sequences into N network topology maps respectively; an encoding network 303, in which an input end of the encoding network 303 is connected to an output end of the sequence-to-graph conversion model 302, and the encoding network 303 acquires the question and the N network topology maps; the encoding network performs a first coding on the question, to obtain the semantic representation vector of the question; and the encoding network 303 also performs a second encoding on each of the N network topology maps, to obtain the semantic representation vector of each of the N network topology maps; and a matching network 304, in which an input end of the matching network 304 is connected to an output end of the encoding network 303, and the matching network 304 acquires the semantic representation vector of the question and the semantic representation vector of each of the N network topology maps, and calculates a semantic matching degree of each of the N network topology maps to the question according to the semantic representation vector of the question and the semantic representation vector of each of the N network topology maps.

Optionally, as shown in FIG. 14, the coding network 303 includes: a first encoder 3031 acquiring and encoding the question, to obtain a semantic representation vector of the question; and a second encoder 3032, in which an input end of the second encoder 3032 is connected to the output end of the sequence-to-graph conversion model 302, and the second encoder 3032 acquires the N network topology maps and encodes each of the N network topology maps, to obtain the semantic representation vector of each of the N network topology maps; in which both an output end of the first encoder 3031 and an output end of the second encoder 3032 are connected to an input end of the matching network 304.

Optionally, the first encoder 3031 is a serialization encoder, and the second encoder 3032 is a first graph neural network encoder; or the first encoder 3031 is a second graph neural network encoder, and the second encoder 3032 is a third graph neural network encoder.

Optionally, the first encoder 3031 and the second encoder 3032 exchange information based on an attention mechanism.

The question analysis device 300 according to the present disclosure can implement each process implemented by the question analysis device in the question analysis method of the above embodiment, and can achieve the same beneficial effects. To avoid repetition, the details are not repeated herein.

Fourth Embodiment

The present disclosure also provides a knowledge base question answering system, the knowledge base question answering system including the question analysis device of any one of the second embodiments; or the knowledge base question answering system includes the question analysis device of any one of the third embodiments.

The knowledge base question answering system according to the present disclosure can implement each process of the question analysis method in the above embodiments, and can achieve the same beneficial effects. To avoid repetition, the details are not repeated herein.

According to the embodiments of the present disclosure, the present disclosure also provides an electronic equipment and a readable storage medium.

Figure 15:
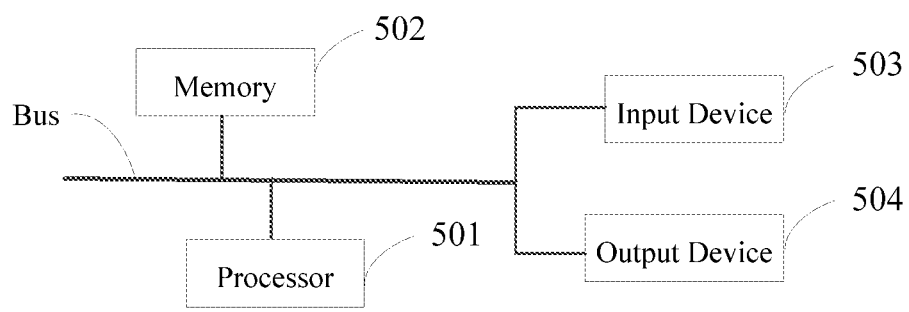
FIG. 15 is a block diagram showing an electronic equipment for realizing the question analysis method according to an embodiment of the present disclosure.

As shown in FIG. 15, it is a block diagram showing an electronic equipment for realizing the question analysis method according to an embodiment of the present disclosure. The electronic equipment is intended to represent various forms of digital computers, such as laptop computers, desktop computers, workstations, personal digital assistants, servers, blade servers, mainframe computers, and other suitable computers. The electronic equipment can also represent various forms of mobile devices, such as personal digital processing, cellular phones, smart phones, wearable devices, and other similar computing devices. The components, their connections and relationships, and their functions shown herein are merely examples, and are not intended to limit the implementation of the present disclosure described and/or required herein.

As shown in FIG. 15, the electronic equipment includes one or more processors 501, memories 502, and interfaces for connecting various components, including a high-speed interface and a low-speed interface. The various components are connected to each other by using different buses, and can be installed on a common motherboard or installed in other ways as needed. The processor may process instructions executed in the electronic equipment, including instructions stored in or on the memory to display graphical information of the GUI on an external input/output device (such as a display equipment coupled to an interface). In other embodiments, if necessary, a plurality of processors and/or a plurality of buses can be used along with a plurality of memories. Similarly, a plurality of electronic equipments can be connected, in which each device provides some necessary operations (for example, as a server array, a group of blade servers, or a multi-processor system). In FIG. 15, a processor 501 is taken as an example.

The memory 502 is the non-transitory computer-readable storage medium according to the present disclosure. The memory stores an instruction executable by at least one processor, so that the at least one processor executes the question analysis method according to the present disclosure. The non-transitory computer-readable storage medium of the present disclosure stores a computer instruction, in which the computer instruction is configured to allow a computer execute the question analysis method according to the present disclosure.

As a non-transitory computer-readable storage medium, the memory 502 can be used to store a non-transitory software program, a non-transitory computer-executable program, and a module, e.g., a program instruction/module corresponding to the question analysis method in the embodiments of the present disclosure (for example, the analysis module 201, the conversion module 202, the calculation module 203 and the selection module 204 as shown in FIG. 13). The processor 501 executes various functional applications of the question analysis device and data processing by running non-transitory software programs, instructions, and modules stored in the memory 502, thereby realizing the question analysis method in the above method embodiment.

The memory 502 may include a storage program area and a storage data area, in which the storage program area may store an operating system and an application program required by at least one function; and the storage data area may store data created by using the electronic equipment based on the question analysis method. In addition, the memory 502 may include a high-speed random access memory, and may also include a non-transitory memory, e.g., at least one of a magnetic disk storage device, a flash memory device, or other non-transitory solid-state storage devices. In some embodiments, the memory 502 may optionally include memories remotely arranged with respect to the processor 501, and these remote memories may be connected to the electronic equipment of the question analysis method via a network. The examples of the above networks include, but are not limited to, the INTERNET, a corporate intranet, a local area network, a mobile communication network, and a combination thereof.

The electronic equipment of the question analysis method may further include: an input device 503 and an output device 504. The processor 501, the memory 502, the input device 503, and the output device 504 may be connected by a bus or in other manners. In FIG. 15, a bus connection is taken as an example.

The input device 503 can receive input digital or character information, and generate a key signal input related to the user setting and function control of the electronic equipment of the question analysis method, e.g., a touch screen, a keypad, a mouse, a track pad, a touch pad, a pointing stick, one or more mouse buttons, a trackball, a joystick and other input devices. The output device 504 may include a display equipment, an auxiliary lighting device (e.g., LED), a tactile feedback device (e.g., a vibration motor), and the like. The display equipment may include, but is not limited to, a liquid crystal display (LCD), a light emitting diode (LED) display, and a plasma display. In some embodiments, the display equipment may be a touch screen.

Various embodiment of the systems and techniques described herein can be implemented in a digital electronic circuit system, an integrated circuit system, a specific ASIC (application specific integrated circuits), a computer hardware, firmware, a software, and/or a combination thereof. These various embodiments may include: being implemented in one or more computer programs, in which the one or more computer programs may be executed and/or interpreted on a programmable system including at least one programmable processor, in which the programmable processor can be a dedicated or general programmable processor, and can receive data and instructions from the storage system, at least one input device, and at least one output device, and transmit the data and instructions to the storage system, the at least one input device, and the at least one output device.

These calculation programs (also known as programs, softwares, software applications, or codes) include machine instructions of programmable processors; and these calculation programs can be implemented by using high-level procedures and/or object-oriented programming languages, and/or assembly/machine languages. As used herein, the terms "machine-readable medium" and "computer-readable medium" refer to any computer program product, equipment, and/or device (e.g., a magnetic disk, an optical disk, a memory, a programmable logic device (PLD)) used to provide machine instructions and/or data to a programmable processor, including a machine-readable medium that receive the machine instructions as a machine-readable signal. The term "machine-readable signal" refers to any signal for providing the machine instructions and/or data to a programmable processor.

In order to provide an interaction with the user, the systems and techniques described herein can be implemented on a computer, in which the computer has a display equipment (for example, a CRT (cathode ray tube) or LCD (liquid crystal display) monitor)) for displaying an information to the user; and a keyboard and a pointing device (e.g., a mouse or a trackball), in which the user can provide an input to the computer through the keyboard and the pointing device. Other types of devices can also be used to provide an interaction with the user; for example, the feedback provided to the user can be any form of sensory feedback (e.g., a visual feedback, an auditory feedback, or a tactile feedback); and can receive input in any form (including an acoustic input, a voice input, or a tactile input) from the user.

The systems and technologies described herein can be implemented in a computing system including background components (e.g., as a data server), a computing system including middleware components (e.g., an application server), a computing system including front-end components (e.g., a user computer having a graphical user interface or a web browser, through which the user can interact with the implementation of the system and technology described herein), or a computing system including any combination of the background components, the middleware components or the front-end components. The components of the system can be connected to each other through digital data communication in any form or medium (e.g., a communication network). Examples of communication networks include: a local area network (LAN), a wide area network (WAN), and the INTERNET.

The computer system can include clients and servers. The clients and servers are generally far away from each other and usually interact through a communication network. The relationship between the client and the server is generated by a computer program running on a corresponding computer and having a client-server relationship with each other.

According to the technical solution of the example of the present disclosure, the question analysis process includes two processes from rough to refined: the first process realizes the conversion from the question to the candidate query graph, and the second process realizes the determination of the query graph from the candidate query graph. The former quickly and efficiently realizes the conversion of the question word sequence to the linearized sequence in a sequence-to-sequence manner, and quickly and efficiently realizes the conversion of the linearized sequence to the network topology map, thereby quickly and efficiently generating a plurality of candidate query graphs for the question. The latter realizes the accurate matching between the question and the query graph, and improves the accuracy of the question to the query graph, thereby improving the accuracy of question analysis. Since the above technical means are adopted, the question that the query graph generated based on the fusion method of word sequences in the related art has relatively poor accuracy is well solved.

It should be understood that the various forms of processes shown above can be used to reorder, add or delete steps. For example, the steps described in the present disclosure can be executed in parallel, sequentially, or in a different order, as long as the desired result of the technical solution disclosed in the present disclosure can be achieved, and thus them are not limited herein.

The above specific embodiments do not constitute a limitation on the protection scope of the present disclosure. Those skilled in the art should understand that various modifications, combinations, sub-combinations and substitutions can be made according to design requirements and other factors. Any amendments, equivalent substitutions and improvements made within the spirit and principle of the present disclosure shall be included in the protection scope of the present disclosure.

What is claimed is:

1. A question analysis method, comprising:
analyzing a question to obtain N linearized sequences, N being an integer greater than 1;
converting the N linearized sequences into N network topology maps;
separately calculating a semantic matching degree of each of the N network topology maps to the question; and
selecting a network topology map having a highest semantic matching degree to the question as a query graph of the question from the N network topology maps;

wherein the separately calculating the semantic matching degree of each of the N network topology maps to the question comprises:
acquiring a semantic representation vector of the question;
acquiring a semantic representation vector of each of the N network topology maps; and
separately calculating the semantic matching degree of each of the N network topology maps to the question according to the semantic representation vector of the question and the semantic representation vector of each of the N network topology maps;
wherein the method further comprises:
in the acquiring the semantic representation vector of the question and the semantic representation vector of the network topology map, exchanging information between the question and the network topology map based on an attention mechanism, to generate the semantic representation vector of the question and the semantic representation vector of the network topology map.

2. The method of claim 1, wherein the acquiring the semantic representation vector of the question comprises:
acquiring a semantic representation vector corresponding to a word sequence of the question; or
converting the word sequence of the question into a graph structure, and acquiring a semantic representation vector of the graph structure.

3. The method of claim 2, wherein the graph structure is a fully connected graph, where any word in the word sequence of the question is regarded as a node, and any two nodes are connected.

4. A question analysis device, comprising:
an analysis module, configured to analyze a question to obtain N linearized sequences, N being an integer greater than 1;
a conversion module, configured to convert the N linearized sequences into N network topology maps;
a calculation module, configured to separately calculate a semantic matching degree of each of the N network topology maps to the question; and
a selection module, configured to select a network topology map having a highest semantic matching degree to the question as a query graph of the question from the N network topology maps;
wherein the calculation module includes:
a first acquisition sub-module configured to acquire the semantic representation vector of the question;
a second acquisition sub-module configured to acquire the semantic representation vector of each of the N network topology maps; and
a calculation sub-module configured to separately calculate a semantic matching degree of each of the N network topology maps to the question according to the semantic representation vector of the question and the semantic representation vector of each of the N network topology maps;
the question analysis device further includes: an interaction module, configured to, in the acquiring the semantic representation vector of the question and the semantic representation vector of the network topology map, exchange information between the question and the network topology map based on an attention mechanism, to generate the semantic representation vector of the question and the semantic representation vector of the network topology map.

5. A question analysis device, comprising:
a translation model, configured to acquire a question and analyze the question to obtain N linearized sequences, N being an integer greater than 1;
a sequence-to-graph conversion model, wherein an input end of the sequence-to-graph conversion model is connected to an output end of the translation model, and the sequence-to-graph conversion model acquires the N linearized sequences and converts the N linearized sequences into N network topology maps respectively;
an encoding network, wherein an input end of the encoding network is connected to an output end of the sequence-to-graph conversion model, and the encoding network acquires the question and the N network topology maps; the encoding network performs a first coding on the question, to obtain a semantic representation vector of the question; and the encoding network also performs a second encoding on each of the N network topology maps, to obtain a semantic representation vector of each of the N network topology maps; and
a matching network, wherein an input end of the matching network is connected to an output end of the encoding network, and the matching network acquires the semantic representation vector of the question and the semantic representation vector of each of the N network topology maps, and calculates a semantic matching degree of each of the N network topology maps to the question according to the semantic representation vector of the question and the semantic representation vector of each of the N network topology maps;
wherein the coding network comprises:
a first encoder acquiring and encoding the question, to obtain the semantic representation vector of the question; and
a second encoder, wherein an input end of the second encoder is connected to an output end of the sequence-to-graph conversion model, and the second encoder acquires the N network topology maps and encodes each of the N network topology maps, to obtain the semantic representation vector of each of the N network topology maps;
wherein both an output end of the first encoder and an output end of the second encoder are connected to the input end of the matching network;
wherein the first encoder is a serialization encoder, and the second encoder is a first graph neural network encoder, or, the first encoder is a second graph neural network encoder, and the second encoder is a third graph neural network encoder; or, the first encoder and the second encoder exchange information based on an attention mechanism.

6. A knowledge base question answering system, wherein the knowledge base question answering system comprises the question analysis device of claim 4.

7. A knowledge base question answering system, wherein the knowledge base question answering system comprises the question analysis device of claim 5.

8. An electronic device, comprising:
at least one processor; and
a memory communicatively connected with the at least one processor,
wherein the memory stores an instruction executable by the at least one processor, and the instruction are executed by the at least one processor so that the at least one processor is capable of executing the method of claim 1.

9. A non-transitory computer-readable storage medium storing computer instruction, wherein the computer instruction is configured to allow the computer execute the method of claim 1.

* * * * *

UNITED STATES PATENT AND TRADEMARK OFFICE
CERTIFICATE OF CORRECTION

| | | |
|---|---|---|
| PATENT NO. | : 12,236,361 B2 | Page 1 of 1 |
| APPLICATION NO. | : 17/037612 | |
| DATED | : February 25, 2025 | |
| INVENTOR(S) | : Wenbin Jiang et al. | |

It is certified that error appears in the above-identified patent and that said Letters Patent is hereby corrected as shown below:

On the Title Page

Item (73), change the assignees to:
-- Beijing Baidu Netcom Science Technology Co., Ltd., Beijing (CN) --

Signed and Sealed this
Twenty-sixth Day of August, 2025

Coke Morgan Stewart
*Acting Director of the United States Patent and Trademark Office*